Dec. 16, 1924.
J. A. COSTELLO
FAUCET
Filed Jan. 5, 1924
1,519,668
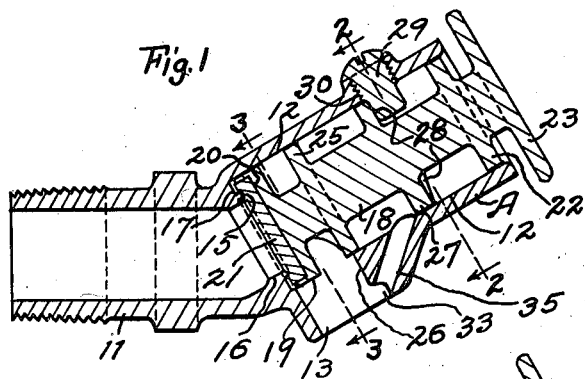
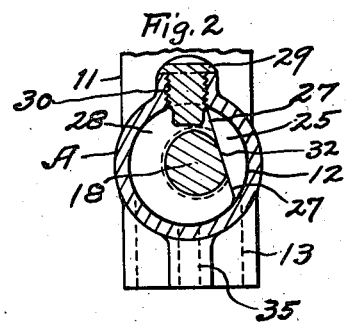
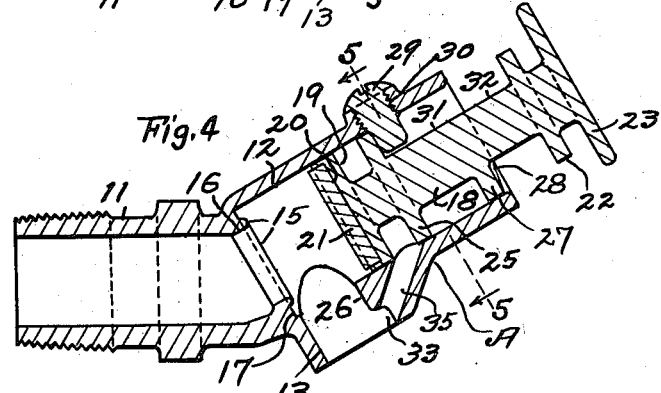
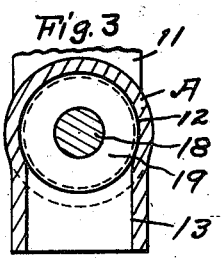
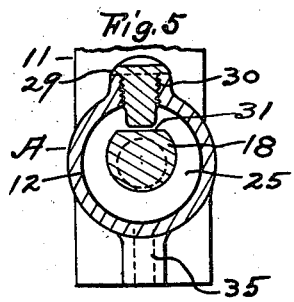
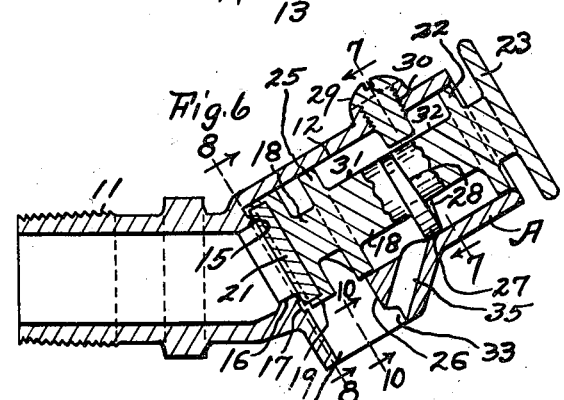
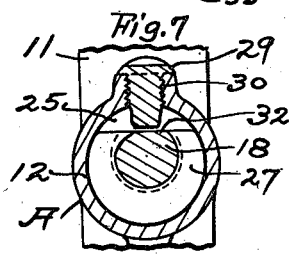
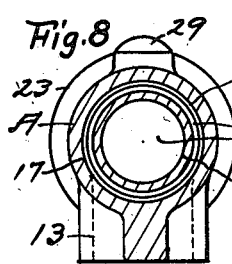
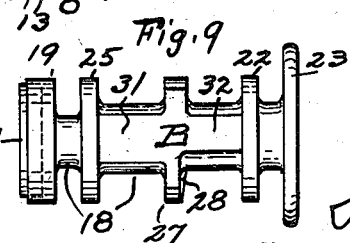
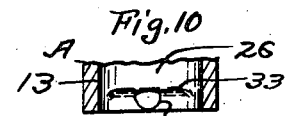
Inventor:
Joseph A. Costello
By
his Attorney.

Patented Dec. 16, 1924.

1,519,668

UNITED STATES PATENT OFFICE.

JOSEPH A. COSTELLO, OF CLEVELAND, OHIO, ASSIGNOR TO THE CLEVELAND BRASS MANUFACTURING COMPANY, OF CLEVELAND, OHIO, A CORPORATION OF OHIO.

FAUCET.

Application filed January 5, 1924. Serial No. 684,597.

*To all whom it may concern:*

Be it known that I, JOSEPH A. COSTELLO, a citizen of the United States, residing at Cleveland, in the county of Cuyahoga and State of Ohio, have invented a new and useful Faucet, of which the following is a specification.

This invention relates to improvements in faucets, and pertains more especially to a faucet well adapted for use in connection with a metal oil-barrel and comprising a casing having an interior chamber which has a fluid-outlet and a fluid-inlet which is surrounded by a seat for a valve employed in controlling communication through said inlet and having a sliding or rectilinear movement from its fully open position to said seat and forceable, upon said movement, into fluid-tight engagement with said seat during the required rotation of the valve.

One object of this invention is to produce a faucet of the character indicated which comprises simple and efficient means for preventing material or objectionable circumferential displacement of the valve during the aforesaid endwise movement of the valve.

Another object is to insure the passage of all liquid entering the hereinbefore mentioned chamber to the hereinbefore mentioned outlet.

Another object is to facilitate the manufacture and assemblage of the component parts of the faucet, and to render the faucet simple and durable in construction.

With these objects in view, and to attain any other objects hereinafter appearing, this invention consists in certain features of construction, and combinations and relative arrangements of parts, hereinafter described in this specification, pointed out in the claims, and illustrated in the accompanying drawings.

In said drawings, Figure 1 is a central vertical longitudinal section of a faucet embodying my invention and shows the valve of the faucet tightly closed. Figs. 2 and 3 are transverse sections taken along the line 2—2 and line 3—3, respectively, in Fig. 1. Fig. 4 is a central vertical longitudinal section and shows the valve in its fully open position. Fig. 5 is a transverse section taken along the line 5—5 in Fig. 4. Fig. 6 is a central vertical longitudinal section, with a portion of the valve in elevation, and shows the valve as having been slid from the position shown in Fig. 4 toward and against the valve-seat before the rotation of the valve to the right as required to force the valve into fluid-tight engagement with the valve-seat. Figs. 7 and 8 are transverse sections taken along the line 7—7 and 8—8, respectively, in Fig. 6. Fig. 9 is a view of the valve detached. Fig. 10 is a section taken along the line 10—10 in Fig. 6.

Referring to said drawings, A indicates the metal casing of my improved faucet, and said casing comprises a substantially horizontal tubular member 11 screw-threaded externally and adapted to be threaded into the head of an oil-barrel. Said casing extends upwardly and forwardly from said tubular member 11 and has an interior chamber 12 having a fluid-outlet 13 formed at the bottom of said casing adjacent the forward end of said member 11. The casing A has an internal forwardly and somewhat upwardly facing valve-seat 15 rearward of and higher than the outlet 13. The chamber 12 extends forwardly and upwardly from the seat 15 and has a fluid-inlet formed by an aperture 16 in and centrally of the rear end wall of said chamber, and said inlet is surrounded by said seat. The casing A also has an internal annular recess 17 which surrounds the seat 15.

My improved faucet comprises a valve arranged to control communication through the fluid-inlet 16 of the chamber 12 and having a metal body comprising a rigid core 18 which is arranged substantially centrally of and is surrounded and extends endwise of and is surrounded by the chamber 12. On the rear end of said core 18 is formed an externally circular head 19 which has bearing in the casing A in any position of the valve and, at its rearward side, has a circular recess 20 tightly occupied by a disk or member 21 secured in place in any approved manner and preferably composed of elastic and compressible material such, for instance, as rubber and arranged to form the face of the valve. On the forward end portion of the core 18 is formed an externally circular head 22 which has bearing in the casing A in the closed position of the valve, as shown in Fig. 1, and said head is provided with a member 23 arranged externally of the casing in any position of the valve and contoured to form a handle for manipulating the valve.

Said valve has a sliding or substantially rectilinear endwise movement to the seat 15 from its fully open position shown in Fig. 4, and in said position of said valve the rearward head 19 has bearing in the casing A forward of the outlet 13 and the forward head 22 of the valve is out of and spaced forwardly from the casing. As shown in Fig. 6, the forward head 22 forms a closure for the forward end of said chamber in the closed position of the valve. Upon its endwise movement from its fully open position to the seat 15 the valve is capable of a limited rotation to the right and forceable into fluid-tight engagement with said seat during said rotation of the valve.

The core 18 has a circumferential annular baffle-flange 25 arranged between and spaced from the beads 19 and 22 and shown spaced considerably farther rearwardly from the forward head 22 than forwardly from the rearward head 19 and contained within the chamber 12 in both the closed position and fully open position of the valve and having bearing in the casing in any position of the valve. The baffle-flange 25 is preferably spaced such a distance forwardly from the rearward head 19 that in the closed position of the valve, as shown in Fig. 1, said flange has bearing in the casing at the inner end of the rearwardly facing forward wall 26 of the outlet 13.

The core 18 also has a circumferential flange 27 arranged between and spaced from the forward head 22 and the baffle-flange 25 and preferably having bearing, at its outer circumference, in the casing A in any position of the valve. The flange 27 has a forwardly facing surface 28 extending circumferentially and endwise of the axis of the valve, and preferably the relative arrangement of the parts is such that said flange, in the fully open position of the valve, has bearing in the casing A in proximity to the forward extremity of the casing.

The casing A is provided, preferably at the top thereof, with a pin 29 spaced forwardly from the rearward head 19 and shown arranged farther forwardly from the valve-seat 15 than rearwardly from the forward extremity of said casing. Said pin is substantially radial in relation to the valve and engages a correspondingly screw-threaded and correspondingly arranged hole 30 formed in the casing and has a plain inner end portion arranged in the chamber 12 between the forward head 22 and the baffle-flange 25.

The core 18 (see Fig. 9) has a surface B which is substantially parallel with the hereinbefore mentioned sliding or substantially rectilinear endwise movement of the valve and extends preferably from the forward side of the baffle-flange 25 forwardly and endwise of the axis of the valve to the forward head 22 and is arranged to extend opposite and in proximity to the inner end face of the pin 29 throughout the endwise movement of the valve from its fully open position shown in Fig. 4 to the seat 15 and forms a shoulder arranged to cooperate with said pin, during said movement of said valve, in preventing material or objectionable circumferential displacement of the valve. Preferably, the shoulder B, as shown in Fig. 9, has the portion 31 thereof which is arranged between the baffle-flange 25 and the rear side of the flange 27 extending farther to the left and wider than the portion 32 of said shoulder between the last-mentioned flange and the forward head 22, and (see Figs. 6, 7 and 9) said last-mentioned flange extends substantially from adjacent ends of the left-hand longitudinal edges of the portions 31 and 32 of said shoulder leftward circumferentially of the core substantially to adjacent ends of the right-hand longitudinal edges of said portions of said shoulder. The rear end of the right-hand longitudinal edge of the narrower portion 32 of said shoulder is spaced farther than the rear end of the left-hand longitudinal edge of said portion of said shoulder forwardly from the rearward extremity of said shoulder, and the surface 28 of the flange 27 extends substantially from the rear end of the left-hand longitudinal edge of said portion 32 of said shoulder leftward circumferentially of the axis of the valve and somewhat in a forward direction substantially to the rear end of the right-hand longitudinal edge of said portion of said shoulder.

The relative arrangement of the parts is such that the rear part of the wider portion 31 of the shoulder B is opposite the inner end face of the pin 29 in the fully open position of the valve, as shown in Fig. 4; that said wider portion 31 of said shoulder measures more in width than said face of said pin measures in diameter and extends laterally of said pin in opposite directions when the valve is in its fully open position shown in Figs. 4 and 5 and cooperates with said pin in preventing material or objectionable circumferential displacement of the valve in opposite directions during endwise movement of the valve to the seat 15 from its fully open position; that the narrower portion 32 of the shoulder B is arranged to cooperate with the pin 29 in preventing material or objectionable circumferential displacement of the valve to the left in the position of the valve shown in Figs. 6 and 7; that the core 18 has the portion thereof which extends from the forward side of the flange 27 to the rear face of the forward head 22 contoured in cross-section, as shown in Fig. 7, as required to permit a limited rotation of the valve to the right upon the endwise movement of the valve from its fully open position to the seat 15; that, when the valve is in the position shown in Fig. 6, the rear end of the left-hand longitudinal edge of the narrower portion 32 of the shoulder B and the adjacent portion or extremity of the surface 28 of the flange 27 are arranged rearward of the pin 29; that said surface 28 is arranged to engage and be pressed against by the rear side of the inner end portion of said pin during said rotation of the valve to the right, and that said pin and said surface 28 are therefore relatively arranged to cooperate in forcing the valve into tight engagement with said seat during said rotation of the valve.

The relative arrangement of parts is also such that the valve-seat 15 is somewhat embedded in the elastic and compressible member 21, as exaggeratively illustrated in Fig. 1, when the valve is in its tightly closed position, and obviously in said position of the valve a forceable turn of the valve to the left is required preliminary to movement of the valve into its fully open position.

The rearwardly facing forward wall 26 of the outlet 13 has a recess 33 extending transversely of the lower portion of said wall, and the casing A has a drain-passage 35 extending downwardly and rearwardly from a suitable point between the inner end of said outlet and the forward end of the chamber 12, and said passage discharges at its lower end into said recess preferably centrally between the ends of the recess. Said recess forms a forward enlargement of the lower end of the outlet 13, and hence the passage 35 discharges into said outlet. Preferably the relative arrangement of the parts is such that the passage 35 communicates, rearward of the flange 27, with the chamber 12 in any position of the valve; that said passage communicates, between said flange 27 and the baffle-flange 25 and therefore forward of said baffle-flange 25, with said chamber in the closed position of the valve, as shown in Fig. 1; that said baffle-flange 25 has bearing, forward of the outlet 13, in the casing A when the valve is closed, and that the passage 35 is in communication, at its upper end between the rearward head 19 and the baffle-flange 25 and therefore rearward of said baffle-flange, with the chamber 12 in the fully open position of the valve, as shown in Fig. 4.

By the hereinbefore described construction and relative arrangements of parts it will be observed that the baffle-flange 25 is rearward, in any position of the valve, of the means for forcing the valve into fluid-tight engagement with the seat 15 and spaced rearwardly from said means in the closed position of the valve, and that the pin 29 serves as an abutment for the baffle-flange 25 in the fully open position of the valve, as shown in Fig. 4.

During the actuation of the valve from its closed position shown in Fig. 1 into its fully open position shown in Fig. 4 the baffle-flange 25 obstructs the passage, in the direction of the forward end of the chamber 12, of liquid passing forwardly in said chamber at the inner end of the wall 26 of the outlet 13. However, during the rush or flow of liquid at the rear end of and into the chamber 12 during the opening of the valve, and more especially during the flow of liquid under pressure into said chamber, the passage of some liquid forwardly at the inner end of the wall 26 and transversely of the outer circumferential edge of the baffle-flange 25 in the direction of the forward end of said chamber is not impossible, because the use of packing is avoided and said flange is not therefore, in tight relation to the casing A, but the drain-passage 35 and the here nbefore described arrangement of said passage in relation to the chamber 12 and outlet 13 participate in preventing liquid, which has passed to and forwardly of the forward side of the baffle-flange 25, from passing forwardly to the forward extremity of the chamber 12, without necessitating the use of packing. The rush or flow of liquid through the outlet 13 from the inlet 16 in the open position of the valve results in the creation of suction within the passage 35, so that any liquid passing forwardly at the inner end of the outlet 13 and between the rearward head 19 and baffle-flange 25 in opening the valve, or in the open position of the valve, is acted on by said suction and thereby drawn from said chamber through said passage 35 into the outlet 13. Also, as the liquid drained by the passage 35 flows into the recess or forward enlargement 33 of the lower portion of said outlet 13 and as the upper portion of the rearwardly facing forward wall 26 of said outlet 13 is arranged to be impinged against by liquid rushing or flowing from the inlet 16 into said outlet 13 in the open position of the valve, objectionable interference with the discharge of liquid from the passage 35 into and downwardly from said outlet is successfully avoided.

What I claim is:

1. A faucet comprising a casing having an internal forwardly facing valve-seat and an interior chamber which extends forwardly from said seat and has a fluid-outlet adjacent and a fluid-inlet surrounded by said seat, a valve having bearing in the casing and controlling communication through said inlet and capable of limited rotation in one direction upon movement of the valve from its fully open position to said seat and comprising a core extending endwise of and surrounded by said chamber, said core having a circumferential baffle-flange which is spaced rearwardly from the forward end of the core and forwardly from the aforesaid outlet in the fully open position of the valve, and means forward of said flange for forcing the valve into fluid-tight engagement with the aforesaid seat during the aforesaid rotation of the valve, the casing having a drain-passage which discharges, at one end, into the aforesaid outlet at a point spaced downwardly from the upper end of said outlet and is in communication, at its other end, with the aforesaid chamber forward or rearward of said flange according as the valve is in its closed or fully open position.

2. A faucet comprising a casing having an internal valve-seat and an interior chamber which extends from said seat in the direction in which the seat faces and has a fluid-outlet adjacent and a fluid-inlet surrounded by said seat, a pin rigid with and arranged substantially radially of the casing and spaced from said outlet in said direction and having its inner end portion in said chamber, and a valve having bearing in the casing and controlling communication through the aforesaid inlet and capable of limited rotation in one direction upon movement of the valve from its fully open position to said seat and comprising a rigid core which extends endwise of and is surrounded by said chamber and has a circumferential flange having a surface which extends circumferentially and endwise of the axis of the valve and is arranged to cooperate with said pin in forcing the valve into fluid-tight engagement with the aforesaid seat during said rotation of the valve, said core having a circumferential baffle-flange arranged between and spaced from the first-mentioned flange and inner end of the core.

3. A faucet comprising a casing having an internal forwardly facing valve-seat and an interior chamber which extends forwardly from said seat and has a fluid-outlet adjacent and a fluid-inlet surrounded by said seat, a pin rigid with the casing and spaced forwardly from said outlet and extending into said chamber, and a valve having bearing in the casing and controlling communication through the aforesaid inlet and capable of limited rotation in one direction upon movement of the valve from its fully open position to the aforesaid seat and comprising a rigid core which is surrounded by and extends endwise of said chamber and has a flange having a surface which extends circumferentially and endwise of the core and is arranged to cooperate with the pin in forcing the valve into fluid-tight engagement with said seat during said rotation of the valve, said core having a circumferential baffle-flange which is spaced rearwardly from the first-mentioned flange and forwardly from the inner end of the core and has bearing in the casing, and the casing having a drain-passage discharging into the aforesaid outlet and communicating, between said flanges, with the aforesaid chamber when the valve is closed.

4. A faucet comprising a casing having an internal valve-seat and an interior chamber which has a fluid-outlet and a fluid-inlet which is surrounded by said seat, and a valve having bearing in the casing and also having an endwise movement from its fully open position to said seat, said casing and said valve being provided in the aforesaid chamber the one with a pin and the other with a shoulder which extends endwise of the axis of the valve and is opposite and in proximity to an end face of the pin throughout said movement of the valve and arranged to cooperate with the pin, during said movement of the valve, in preventing material circumferential displacement of the valve, the shouldered member having the portion thereof which is opposite said face of said pin upon the aforesaid endwise movement of the valve contoured as required to permit a limited rotation of the valve in one direction upon said endwise movement, and said shouldered member having a surface which extends circumferentially and endwise of the axis of the valve and is arranged to cooperate with said pin in forcing the valve into fluid-tight engagement with the aforesaid seat during said rotation of the valve.

5. A faucet comprising a casing having an internal forwardly facing valve-seat and an interior chamber which extends forwardly from said seat and has a fluid-outlet adjacent and a fluid-inlet surrounded by said seat, and a valve having bearing in the casing and also having a substantially rectilinear endwise movement from its fully open position to said seat and comprising a rigid core surrounded by and extending endwise of said chamber, said core and the casing being provided in said chamber the one with a pin spaced forwardly from the aforesaid outlet and the other with a shoulder which is substantially parallel with said endwise movement of the valve and arranged to cooperate with the pin in preventing material circumferential displacement of the valve throughout said movement of the valve, the shouldered member being contoured as required to permit limited rotation of the valve in one direction upon said endwise movement of the valve, and said shouldered member also having a surface which extends circumferentially and endwise of the axis of the valve and is arranged to cooperate with the pin in forcing the valve into fluid-tight engagement with the aforesaid seat during said rotation of the valve.

6. A faucet comprising a casing having an internal valve-seat and an interior chamber having a fluid-outlet adjacent and a fluid-inlet surrounded by said seat, a pin rigid with the casing and extending into said chamber, and a valve capable of substantially rectilinear endwise movement from its fully open position to said seat and comprising a core which is surrounded by and extends endwise of the casing and has a shoulder opposite the inner end face of the pin during said movement and in the fully open position of the valve, said core having the portion thereof which is opposite said face of the pin upon said movement of the valve contoured as required to permit a limited rotation of the valve and also having a surface arranged to cooperate with the pin in forcing the valve into fluid-tight engagement with the aforesaid seat during said rotation of the valve; and a portion of the aforesaid shoulder extending rearwardly from the space between the shoulder and the pin upon the aforesaid endwise movement of the valve and arranged to cooperate with the pin in preventing material circumferential displacement of the valve in opposite directions during said endwise movement of the valve.

7. A faucet comprising a casing having an internal valve-seat and an interior chamber having a fluid-outlet adjacent and a fluid-inlet surrounded by said seat, a valve controlling communication through said inlet and having an endwise movement from its fully open position to said seat and capable of limited rotation upon said endwise movement and comprising a core which extends endwise of the casing and is surrounded by said chamber and has a circumferential baffle-member spaced from the inner end of the core and a head spaced outwardly from said baffle-member and arranged to form a closure for said chamber when the valve is closed, and a pin rigid with the casing and extending between said baffle-member and said head, said pin and the core having surfaces arranged to cooperate in forcing the valve into fluid-tight engagement with the aforesaid seat during the aforesaid rotation of the valve, the core having a shoulder arranged to cooperate with the pin in preventing material circumferential displacement of the valve during the aforesaid endwise movement and in the fully open position of the valve, and said pin being arranged to form an abutment for the aforesaid baffle-member in the fully open position of the valve.

8. A faucet comprising a casing which has an internal valve-seat and an interior chamber extending from said seat in the direction in which the seat faces and having a fluid-outlet adjacent and a fluid-inlet surrounded by said seat, and a valve controlling communication through said inlet and also having a substantially rectilinear endwise movement from its fully open position to said seat and capable of limited rotation in one direction upon said endwise movement and comprising a core which extends endwise of and is surrounded by said chamber and has a circumferential baffle-flange spaced from the inner end of the core and having bearing in the casing in both the fully open position and closed position of the valve, said core also having a head which is spaced outwardly from said flange and has bearing in the casing or is out of the casing according as the valve is in its closed position or fully open position, and means whereby the valve is forced into fluid-tight engagement with the aforesaid seat during the aforesaid rotation of the valve, said means being arranged between the aforesaid baffle-flange and the aforesaid head.

9. A faucet comprising a casing which has an internal forwardly facing valve-seat and an interior chamber extending forwardly from said seat and having a fluid-outlet adjacent and a fluid-inlet surrounded by said seat, a valve having an endwise movement from its fully open position to said seat and capable of limited rotation upon said endwise movement and comprising a rigid core which extends endwise of said chamber and has a baffle-flange spaced from the inner end of said core and a head spaced forwardly from said flange and having bearing in the casing when the valve is closed, and a pin rigid with the casing and arranged between said flange and said head in the closed position of the valve, said pin and the core having cooperating surfaces arranged to force the valve into fluid-tight engagement with the aforesaid seat during the aforesaid rotation of the valve, and said core having a shoulder which extends toward the aforesaid head from the aforesaid flange and is arranged at the top of the core in the fully open position of the valve and adapted to cooperate with the pin in preventing material circumferential displacement of the valve during the aforesaid endwise movement and in the fully open position of the valve.

10. A faucet comprising a casing having an internal forwardly facing valve-seat and an interior chamber which extends forwardly from said seat and has a fluid-outlet adjacent and a fluid-inlet surrounded by said seat, a valve having an endwise movement from its fully open position to said seat and capable of limited rotation upon said endwise movement and comprises a core extending endwise of said chamber and having a head which has bearing in the casing forward of said outlet in the fully open position of the valve and is provided with a member forming the face of the valve and arranged to engage said seat in the closed position of the valve, said core having a baffle-flange spaced forwardly from said head, and means forward of said flange for forcing the valve into fluid-tight engagement with the aforesaid seat during the aforesaid rotation of the valve, the rearwardly facing forward wall of the aforesaid fluid-outlet having a recess extending transversely of said wall, and the casing having a drain-passage discharging into said recess and communicating, between the aforesaid flange and the aforesaid head, with the aforesaid chamber in the fully open position of the valve.

11. A faucet comprising a casing which has an internal forwardly facing valve-seat and an interior chamber extending forwardly from said seat and having a fluid-outlet adjacent and below said seat and a fluid-inlet surrounded by said seat, a valve capable of limited rotation upon movement of the valve from its fully open position to said seat and comprising a core which extends endwise of said chamber and has a head having bearing in the casing forward of said outlet in the fully open position of the valve and provided with a member which forms the face of the valve and is arranged to engage said seat in the closed position of the valve, said core having a baffle-flange spaced forwardly from said head, and means for forcing the valve into fluid-tight engagement with said seat during the aforesaid rotation of the valve, the rearwardly facing forward wall of the aforesaid fluid-outlet having a recess spaced from the upper extremity and extending transversely of said wall, and the casing having a drain-passage extending downwardly from the aforesaid chamber at a point between the aforesaid flange and the aforesaid head in the fully open position of the valve and discharging into said recess centrally between the ends of the recess.

In testimony whereof, I sign the foregoing specification.

JOSEPH A. COSTELLO.